(12) United States Patent
Jacoby

(10) Patent No.: US 9,600,482 B2
(45) Date of Patent: *Mar. 21, 2017

(54) MEDIA AND LOCATION BASED SOCIAL NETWORK

(71) Applicant: MOTORMOUTH, LLC, Midlothian, VA (US)

(72) Inventor: Daniel Jacoby, Boca Raton, FL (US)

(73) Assignee: MOTORMOUTH, LLC, Midlothian, VA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/084,364

(22) Filed: Mar. 29, 2016

(65) Prior Publication Data
US 2016/0210287 A1 Jul. 21, 2016

Related U.S. Application Data

(63) Continuation of application No. 13/894,249, filed on May 14, 2013, now Pat. No. 9,305,020.

(60) Provisional application No. 61/647,509, filed on May 16, 2012.

(51) Int. Cl.
| G06F 7/00 | (2006.01) |
| G06F 17/00 | (2006.01) |
| G06F 17/30 | (2006.01) |
| G06Q 50/00 | (2012.01) |

(52) U.S. Cl.
CPC .... *G06F 17/30035* (2013.01); *G06F 17/3005* (2013.01); *G06F 17/30041* (2013.01); *G06F 17/3087* (2013.01); *G06F 17/30241* (2013.01); *G06F 17/30598* (2013.01); *G06Q 50/01* (2013.01)

(58) Field of Classification Search
CPC ......... G06F 17/30241; G06F 17/30265; G06F 17/30743; G06F 17/30755
See application file for complete search history.

(56) References Cited

U.S. PATENT DOCUMENTS

| 8,825,759 | B1* | 9/2014 | Jackson | H04L 67/02 |
| | | | | 705/14.69 |
| 9,262,596 | B1* | 2/2016 | Steiner | G06F 21/10 |
| 9,305,020 | B2* | 4/2016 | Jacoby | G06F 17/30241 |
| 2006/0206582 | A1 | 9/2006 | Finn | |
| 2007/0025194 | A1 | 2/2007 | Morse et al. | |

(Continued)

*Primary Examiner* — Susan Chen
(74) *Attorney, Agent, or Firm* — Troutman Sanders LLP; Ryan A. Schneider; Dustin B. Weeks

(57) ABSTRACT

The present invention is directed to recording and providing media files based on a location. Such systems and methods maybe transacted by a client application or a processor in communication with one or more electronic devices. In accordance with some embodiments of the present invention, methods may include receiving from a first device: a media file; data comprising information identifying a location associated with the media file; storing the media file and data in a database; receiving from a second device information identifying a location of the second device; determining a geographic radius of the second device based upon user selection; determining if one or more media files stored in the database are associated with a location in the geographic radius of the second device; and sending the one or more media files to the second device.

20 Claims, 10 Drawing Sheets

(56) References Cited

U.S. PATENT DOCUMENTS

| | | | |
|---|---|---|---|
| 2007/0214470 A1* | 9/2007 | Glasgow | H04H 60/45 725/10 |
| 2008/0091717 A1 | 4/2008 | Garbow et al. | |
| 2011/0151890 A1* | 6/2011 | Platt | G06Q 10/107 455/456.1 |
| 2011/0225250 A1 | 9/2011 | Cypes et al. | |
| 2013/0260795 A1* | 10/2013 | Papakipos | H04W 4/023 455/456.3 |

* cited by examiner

FIGURE 2

| 20 | PHOTOS | AUDIO FILES | TOPIC I | TOPIC II |
|---|---|---|---|---|
| DEFAULT 210 | X 211 | X 212 | X 213 | X 214 |
| FAMILY 220 | X 221 | X 222 | 223 | X 224 |
| FRIENDS 230 | 231 | X 232 | X 233 | X 234 |
| COLLEAGUES 240 | 241 | X 242 | 243 | X 244 |

MEDIA AND LOCATION BASED SOCIAL NETWORK

CROSS-REFERENCE TO RELATED APPLICATIONS

This Application is a continuation of U.S. application Ser. No. 13/894,249 filed May 14, 2013, which application claims priority to U.S. Provisional Patent Application No. 61/647,509, filed on May 16, 2012 entitled "Media and Location Based Social Network," the disclosures of each are hereby incorporated by reference in its entirety.

BACKGROUND OF THE INVENTION

The present invention is generally directed to media and location based social networking. More specifically, the present invention is directed to methods and systems for recording audio or other media files associated with a location, and providing recorded audio or media files associated with a location to one or more users.

There are numerous applications, software, and devices that enable users to share, often times via social media, certain thoughts, or pictures. Such thoughts or pictures may be tagged by subject matter, user, etc. for information purposes. However, it is desirable to have a method that combines geo-location and user-submitted media to drive how information is distributed.

Moreover, such media typically involves direct use of a communication device or computer, typically through typing. As restrictions of electronic devices grow—for example, hands-free laws prohibiting the use of typing or texting while driving—a hands-free manner of recording media files is desirable. Similarly, it is desirable to provide media to recipients, such as drivers without the need for continued manual input from the recipient.

SUMMARY OF THE INVENTION

In accordance with some embodiments of the present invention, aspects may include a client application executable on a mobile computing device to provide media and location based social network services, the client application operable to: receive log in information from a user; determine a current location of the device; record media comments made by the user; transmit the recorded comments and a current time and the current location to a server database; and when the user enters an area defined by a radius selected by the user, receive from the server database and play media on the mobile computing device received from other users and associated with the area defined by the radius.

Other aspects in accordance with some embodiments of the present invention may comprise a method of recording and providing media files based on a location associated with the media files, the method transacted amongst a processor and one or more mobile devices, the method comprising: receiving from a first electronic device: a media file; data comprising information sufficient to identify a location associated with the media file; storing the media file and data in a database; receiving from a second electronic device information sufficient to identify a location of the second electronic device; determining a geographic radius of the second electronic device based upon user selection; determining if one or more media files stored in the database are associated with a location in the geographic radius of the second electronic device; and sending the one or more media files stored in the database that are associated with a location in the geographic radius of the second electronic device to the second electronic device.

These and other aspects will become apparent from the following description of the invention taken in conjunction with the following drawings, although variations and modifications may be effected without departing from the spirit and scope of the novel concepts of the invention.

BRIEF DESCRIPTION OF THE DRAWINGS

The present invention can be more fully understood by reading the following detailed description together with the accompanying drawings, in which like reference indicators are used to designate like elements. The accompanying figures depict certain illustrative embodiments and may aid in understanding the following detailed description. Before any embodiment of the invention is explained in detail, it is to be understood that the invention is not limited in its application to the details of construction and the arrangements of components set forth in the following description or illustrated in the drawings. The embodiments depicted are to be understood as exemplary and in no way limiting of the overall scope of the invention. Also, it is to be understood that the phraseology and terminology used herein is for the purpose of description and should not be regarded as limiting. The detailed description will make reference to the following figures, in which:

FIG. 2 depicts a table setting forth exemplary recording attributes, in accordance with some embodiments of the present invention.

Figure 1:
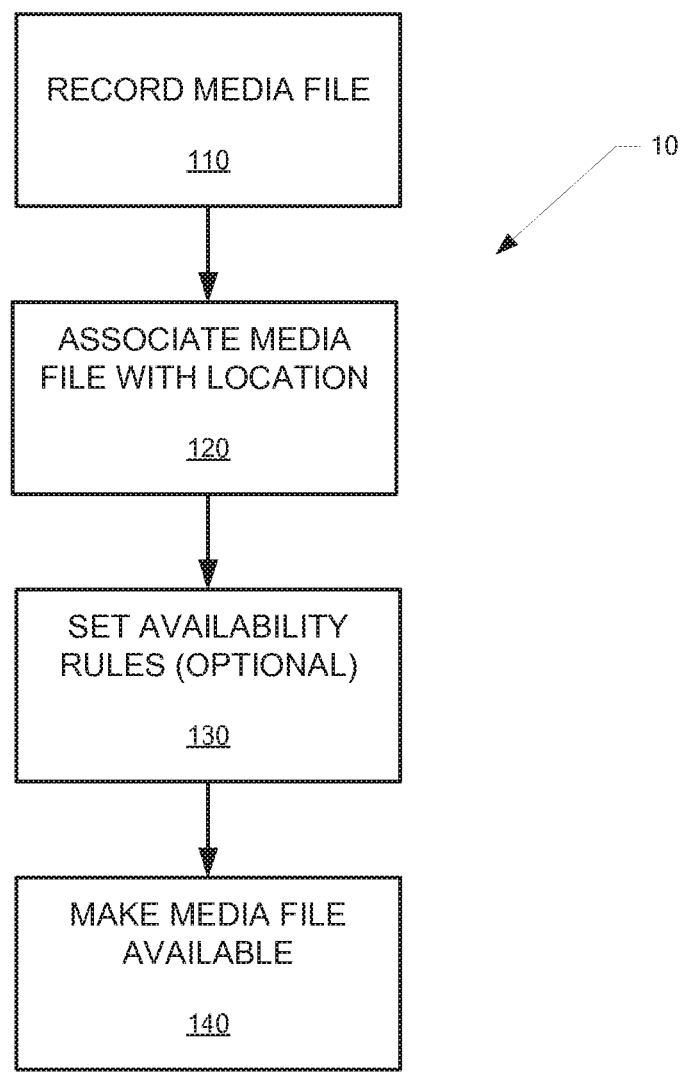
FIG. 1 illustrates an exemplary method of recording media in accordance with some embodiments of the present invention.

Before any embodiment of the invention is explained in detail, it is to be understood that the present invention is not limited in its application to the details of construction and the arrangements of components set forth in the following description or illustrated in the drawings. The present invention is capable of other embodiments and of being practiced or being carried out in various ways. Also, it is to be understood that the phraseology and terminology used herein is for the purpose of description and should not be regarded as limiting.

DETAILED DESCRIPTION OF THE INVENTION

The matters exemplified in this description are provided to assist in a comprehensive understanding of various exemplary embodiments disclosed with reference to the accompanying figures. Accordingly, those of ordinary skill in the art will recognize that various changes and modifications of the exemplary embodiments described herein can be made without departing from the spirit and scope of the claimed invention. Descriptions of well-known functions and constructions are omitted for clarity and conciseness. Moreover, as used herein, the singular may be interpreted in the plural, and alternately, any term in the plural may be interpreted to be in the singular.

As noted above, the present invention is generally directed to the recordation and replay of various media files, based at least in part on a geographic location. Media files may include audio, video, images, animation, and/or any other sort of media capable of transmitting information to a user. Note further that while "audio" is discussed herein, such files may stored, recalled, played, and used in any number of formats, including but not limited to: 3pg, act, AIFF, aac, ALAC, ALS, ASF, Au, AVI, dct, dvf, flac, gsm, m4a, m4p, mp3, mpc, mpeg, msv, ogg, Opus, ra, rm, TTA, vox, wav, wma, or xmf. Moreover, audio files may be saved in formats not typically utilized for audio only recordings, based upon device capabilities, storage parameters, data requirements, etc.

Further, as discussed in more detail below, the present invention may associate a media file with a location. As used herein, a "location" may refer to a specific unique location (for example, an exact longitude and latitude of 24.5553.degree. N, 81.7828.degree. W), or may refer to a general area, town, city, etc. Moreover, "location" may be associated with several geographic locations that have a unifying feature. For example, a location may be defined as "Carnegie Mellon University," but geographically may include both a Carnegie Mellon campus in Pittsburgh, Pa., but also include a Carnegie Mellon campus in Moffett Field, Calif. Similarly, media files associated with a chain retail outlet or restaurant may be associated with multiple geographic locations of such chain retail outlet or restaurant.

Also note that while the discussion below focuses on the location of the recipient of the media files, it is also contemplated and practiced that a recipient's future location may be inferred or assumed. For example, it may be determined—based upon a recipient's rate of change of geographic location that the recipient is in a car, train, airplane, boat, etc. Based upon the determined rate of change (for example, speed that the recipient is traveling) as well as the general direction of movement, media files may be provided to the recipient before the recipient is in the immediate geographic proximity tagged to the media file. Using this approach, a recipient may be receiving (for example, listening to) associated media files about a certain area as the recipient enters the geographic area. Without such determination, a recipient may begin receiving a media file about a geographic location or area as the recipient leaves the geographic location or area, thereby rendering any information conveyed moot or potentially useless to the recipient.

As the discussion below explains, a recipient may be empowered to select options or preferences as to content, geographic range, submitter of the media, provision rules, etc. More specifically, with regard to content a recipient may select to receive media files associated or tagged with a certain topic or topics.

With regard to geographic range, a user may select a larger or smaller geographic region from which to provide media files. For example, a recipient in New York City may elect to only receive media files associated with a geographic area comprising a two-block radius. However, a recipient in Laurens, Iowa (which is less densely populated than New York City) may elect to receive media files associated with a geographic area comprising forty (40) mile radius.

With regard to submitter of the media, a recipient may create groupings of submitters, or may use pre-existing groupings. Social media has caused numerous categorizations of people. For example, FaceBook has "friends" and inner circles and groupings within such "friends." The professional networking site LinkedIn provides not only groups that users may belong to, but lists the degrees of connectedness a user may have to another user in the system. Even products such as mobile telephones running Windows Phone operating systems enables users to break down contacts into groups. Accordingly, some embodiments of the present invention may enable a recipient or contributor to establish their own groups from whom they want to receive and contribute media to, respectively. Alternatively, it is contemplated that in accordance with some embodiments of the present invention a recipient or contributor may use preexisting or pre-established groups in various social networking sites or contacts lists to sort from whom they want to receive or contribute media.

With respect to provision rules, a recipient may elect options as to how the recipient would like the media provided to the recipient. Such rules may set the device to which the media is provided (for example, a mobile telephone, tablet computer, e-reader, laptop, navigation system, etc.), as well as how often to provide the information. For example, in accordance with some embodiments of the present invention, a recipient may be presented with a list or graphical display of media files associated with the recipient's location (or within a range of the location). The recipient may then select which, if any, of the media files the recipient would like to receive.

In accordance with some embodiments, a recipient may select a constant streaming of media, in which case as a recipient travels through an area a recipient may be presented with various media files in succession. For example, in the case of audio files, as a recipient walks through a town or drives through an area, the recipient may be presented with audio files on a relatively constant basis. In accordance with some embodiments of the present invention, the media files may be presented in a substantially live format, thereby providing the recipient with an experience similar to that of listening to a citizens band (CB) radio. Providing a constant feed of media files based upon the current date and time and the user's current latitude and longitude may also be advantageous. As this information may be updated as the user changes location and as time passes and is media-based, there may not be any text to read that may be a hazard for drivers, walkers, runners, or cyclists.

With reference to FIG. 1, a method 10 of recording and saving media will now be discussed. Method 10 may comprise the steps of recording the media file 110, associating the media file with a location 120, set availability rules of the media file, if any 130, and making the media file available 130. Each of these steps is discussed in more detail below.

The step of recording the media file 110 may vary depending on the type of media that is recorded. In the case of images, pictures, or videos, a camera (or camera functionality on a mobile telephone, tablet computer, etc.) may be utilized. In the case of an audio file, a recording functionality on a mobile telephone, table computer, laptop computer, navigation system, or digital recorder may be used.

Note that while the invention generally discusses recording media while the contributor is at a geographic location that is associated with the media, it is also contemplated that a user may record and associate media with a geographic location when the contributor is not at the geographic location. For example, a contributor may record a reminder to be presented when a recipient is at a specific location. Another example may be where a contributor records a media file after visiting a geographic location and associates the media with the geographic location at a subsequent time. Another example may be where a contributor records or associates a media unrelated with geographic areas, with certain geographic areas—for example, thereby creating a geographically driven playlist for road-trips, long-distance runs, scavenger hunts, etc.

Similarly such information can be used to form audio tours, inform various recipients of traffic conditions, or sort by topics that are location dependent (for example, informing a recipient of promotions from local retail outlets as a recipient passes by such outlets).

At any rate, it can be seen that step 110 of recording the media file need not be performed at the geographic location to which the media file is associated with in step 120.

At step 120, the media file is associated with a geographic location. As noted above, the geographic location may be an exact or unique location (such as a specific longitude and latitude combination), or may be several related locations (such as each location of a chain retail outlet). The step of associating the media with the location may be performed automatically by a system receiving the media file, based upon the contributor's location at the time of recordation or submission. Alternatively, the step of associating the media with the location may be performed by the contributor, wherein the contributor may select the location to which to associate the media file.

At step 130, the contributor may set availability rules, if any. Availability rules may dictate or otherwise control which recipients may receive the media file, and under what circumstances. For example, a contributor may record a private message that is to be shared only with friends or other selected groups. Similarly, a contributor may record a private message that is only to be heard by the contributor himself. Alternatively, a contributor may allow the media file to be potentially shared with, or available to, any recipient.

At step 140, the media file may be made available to one or more recipients. Availability may be based upon availability rules, if any (as noted above), as well as by recipient rules and/or system default selections.

With reference to FIG. 2, a sharing profile—or availability rules—20 will now be discussed. A default availability profile 210 may be provided. Default availability profile 210 may be provided by the system, or may be created by a contributor. With reference to FIG. 2, default availability profile 210 may comprise full availability for all types of media files (pictures 211, audio 212) and/or content topics (Topic I 213, Topic II 214). A family profile 220 may be created by a contributor, in which recipients associated with the family group may receive all media files (pictures 221, audio 222), and content associated with Topic II 224, but not content associated with Topic I 223.

A friend profile 230 may not receive pictures 231, but may receive audio files 232 associated with either content topics, Topic I 233 or Topic II 234. A colleague field may only receive audio files 242 with content associated with Topic II 244. Note that this discussion is exemplary only, and various other means, methods, and manners of providing availability rules may be used, and are contemplated by the present invention.

Figure 3:
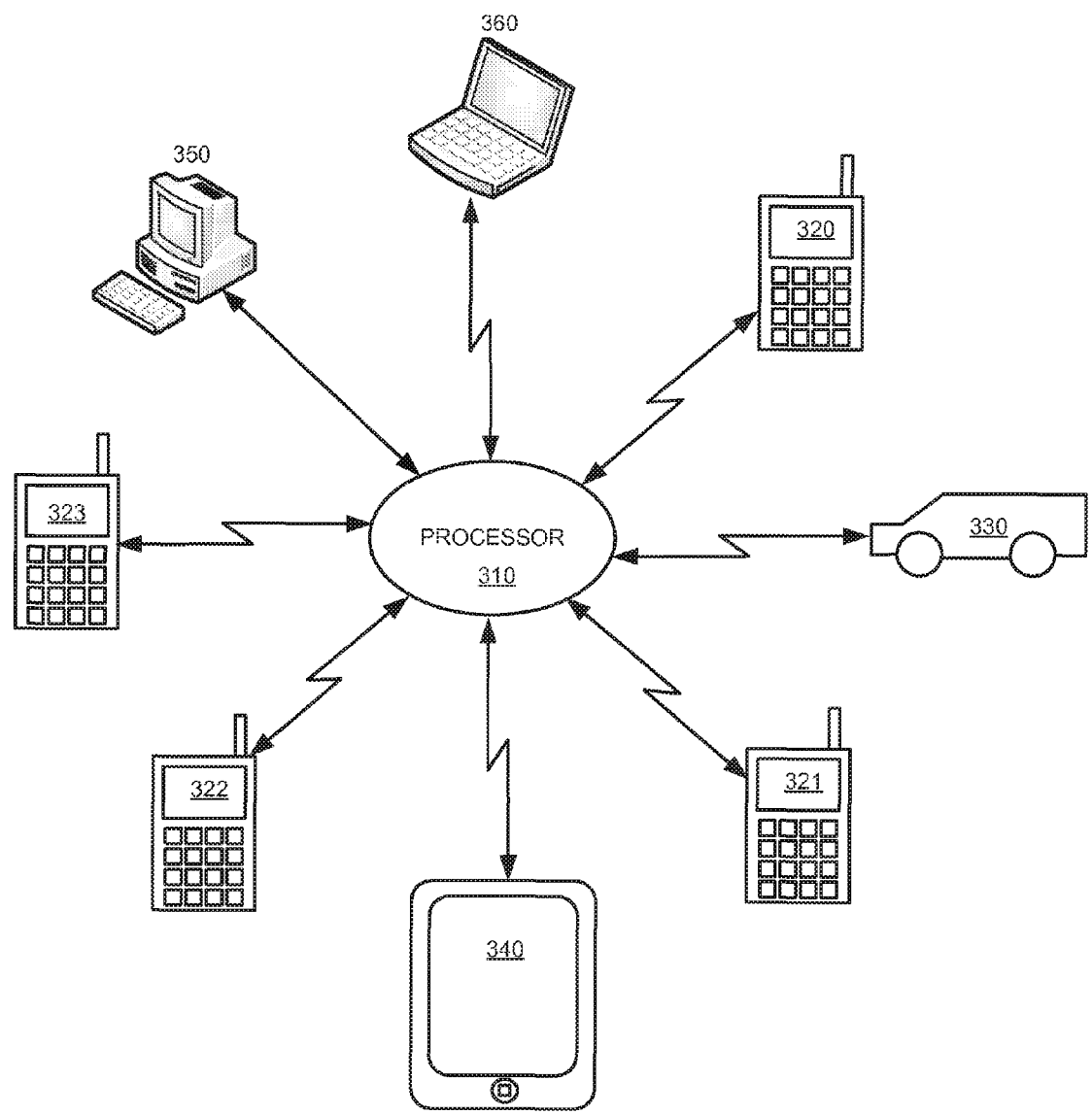
FIG. 3 illustrates a variety of user devices and a central processor, in accordance with some embodiments of the present invention.

With reference to FIG. 3, a general system 30 in accordance with some embodiments of the present invention. System 30 may comprise a processor 310 in communication with a variety of other devices. Other devices may comprise one or more mobile telephones (320, 321, 322, 323), one or more navigation systems 330, one or more tablet computers 340, one or more personal computers 350, and/or one or more laptop computers 360. Note that connections between the variety of devices may be wireless (as in the case of the mobile telephones (320, 321, 322, 323)), or may be wired, as in the case of the personal computer 350.

The variety of electronic devices 320-360 may be used by a contributor or a recipient to contribute media to a processor, or to receive media from the processor.

Figure 4:
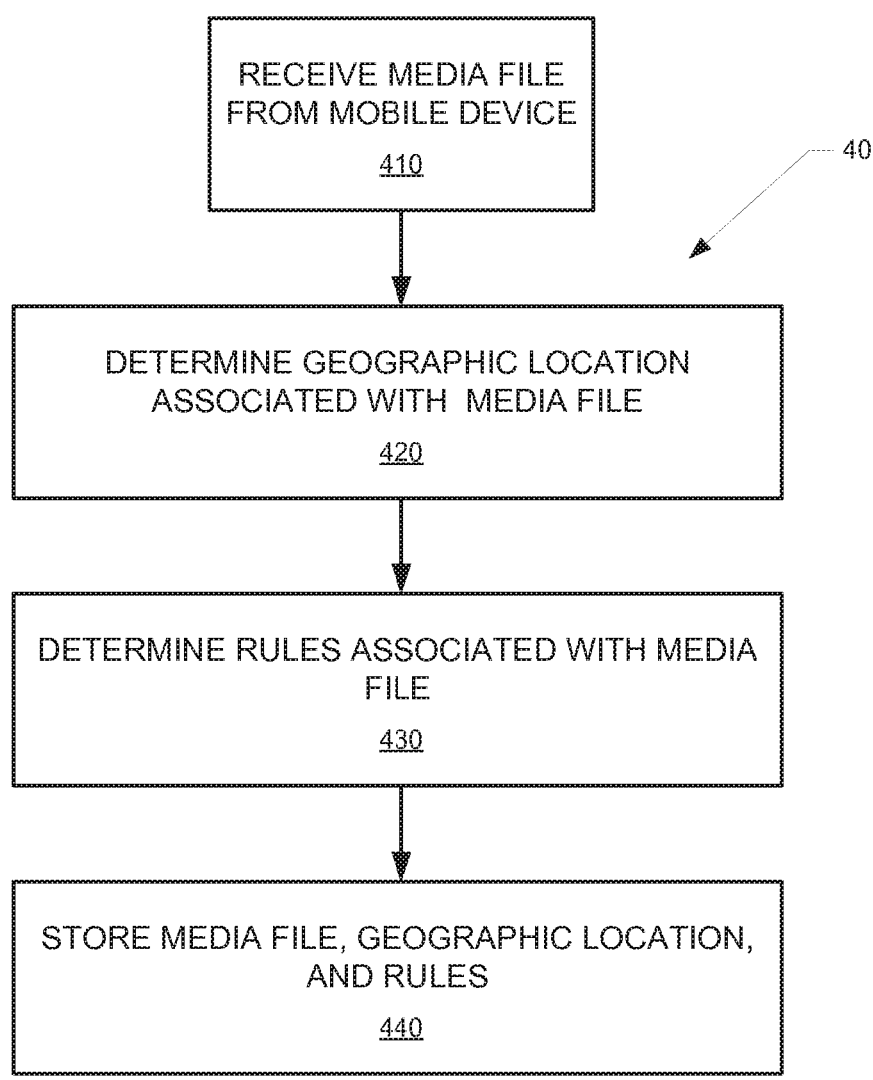
FIG. 4 illustrates an exemplary method of storing media files, in accordance with some embodiments of the present invention.

With reference to FIG. 4, an exemplary method of storing media files at a processor in accordance with some embodiments of the present invention will now be discussed. Note that the method discussed with regard to FIG. 4 sets forth a particular method of receiving the media file and associating a geographic location. However, this method is exemplary, and as noted above geographic locations may be associated by a contributor.

Method 40 may comprise, in general, receiving a media file from a mobile device 410, determining a geographic location associated with the media file 420, determining rules associated with the media file 430, and storing the media file, geographic location associated with the media file, and any applicable rules in a database in selective communication with the processor.

The media file may be received from the mobile device at the processor through, for example, wireless communication. The media file may be transmitted as soon as recorded or selected by the wireless device, or the wireless device may be configured to periodically communicate with the processor. Note that in addition to the media file, it is also contemplated that specific sharing attributes for the specific media file may also be transmitted by the mobile device. If no specific sharing attributes are received, the media file may be treated according to default attributes.

At step 420, the processor may determine the geographic location associated with the media device. This may comprise determining the geographic location of the mobile device that transmitted the media file to the processor (for example, by determining the latitude and longitude of the electronic device), determining a rate of change of geographic location of the electronic device, and/or determining if the contributor assigned any location to the media file.

At step 430, the processor may determine if there are any rules associated with the media file that may impact the distribution or sharing of the media file with one or more recipients. At 440 the central processor may store in a database the media file, associated geographic location, and any applicable sharing rules.

Figure 5:
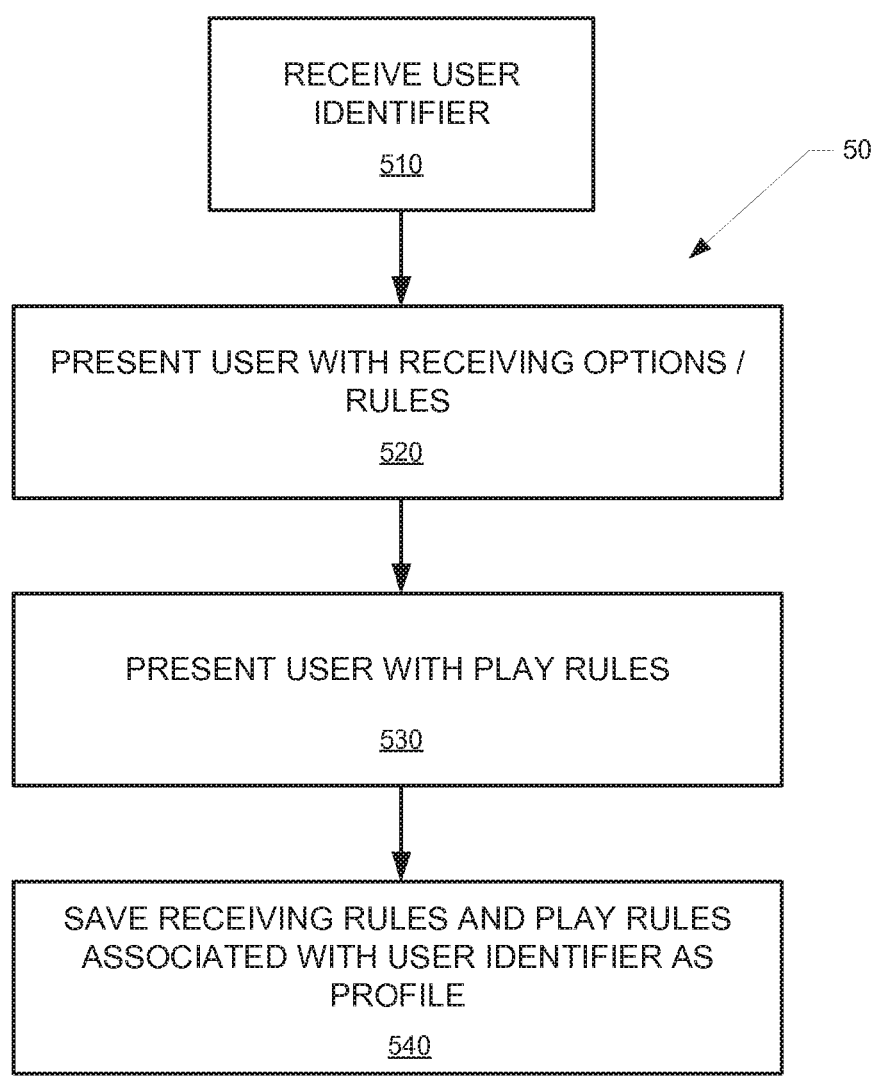
FIG. 5 illustrates an exemplary method of establishing a receiving profile, in accordance with some embodiments of the present invention.

As noted above, a contributor may establish different rules, or profiles, that may provide distinctions in which media files are shared, for example based upon the media type or content. Similarly, a recipient profile may also be established by a recipient. With reference to FIG. 5, the establishment of a recipient profile 50 by a processor may comprise receiving a user identifier 510 (for example, a log on name and/or password, or any other unique or semi-unique indicia that may identify a specific user). At step 520 the processor may preset the user with recipient options and/or rules. The options or rules may limit the recipient to receiving media files from identified contributors or groups, based upon specific geographic areas or proximities, and/or based upon specific topics or content.

At step 530 the processor may present the user with play rules. The play rules may limit or control the play function, such that a recipient may select a constant media file feed (similar to a CB radio feed), or may select to only play media files from a certain geographic proximity. Note that steps 520 and 530 may be part of the same step, in accordance with some embodiments of the present invention.

At step 540 the recipient options and play rules may be saved in a database and associated with the user identifier.

Figure 6:
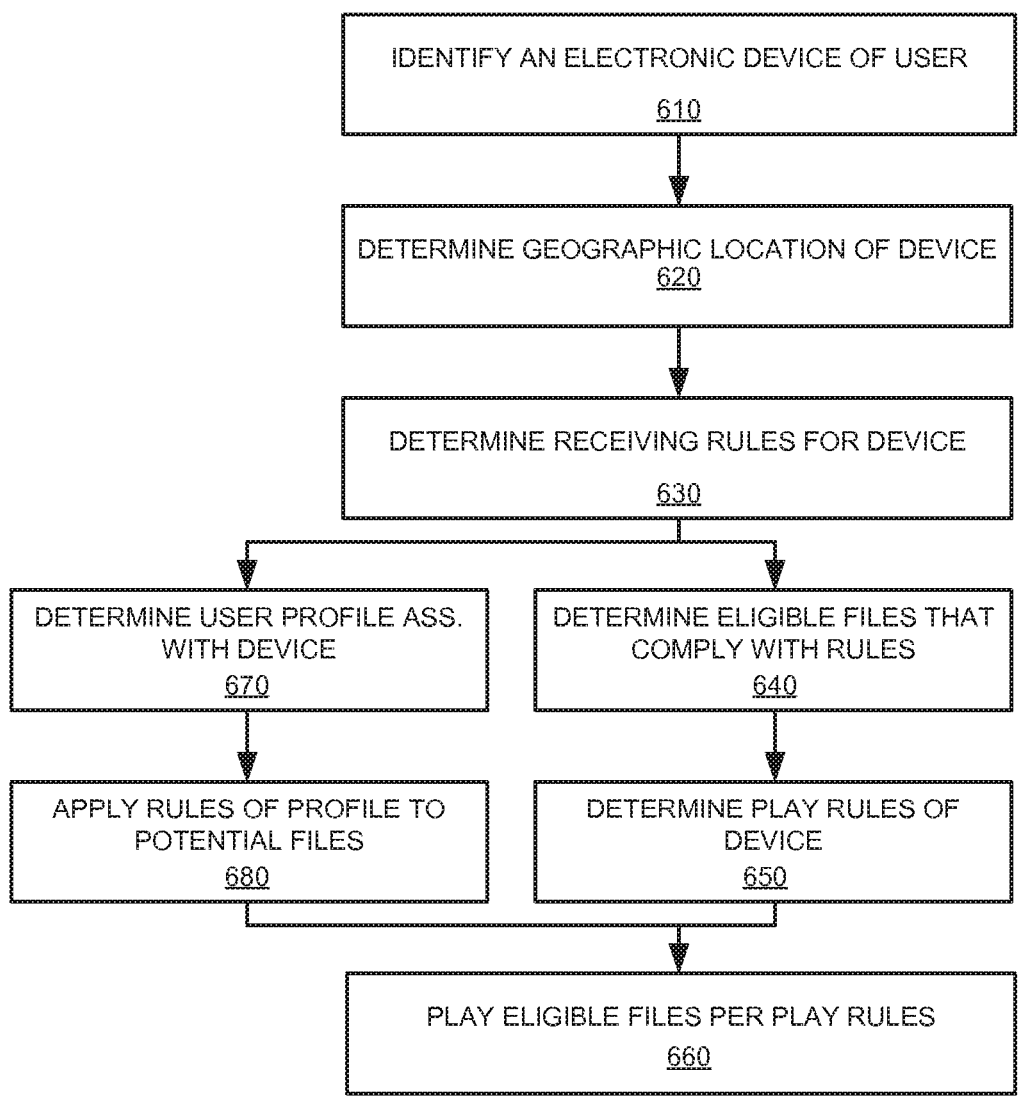
FIG. 6 illustrates an exemplary method of providing media to a user, in accordance with some embodiments of the present invention.

FIG. 6 illustrates a different exemplary method of providing media files to a recipient device, in accordance with some embodiments of the present invention. At 610 the processor may identify a mobile device of a user. This identification may be based upon an indicia associated with the mobile device (e.g., a MIN, serial number, telecommunications account number, telephone number, etc.), or an indicia associated with a user of the mobile device (e.g., log-on and password, handle, user name, indicia, etc.).

At 620 the location of the mobile device may be determined. The location may be determined through longitude and latitude determinations, triangulation of mobile telephone towers, satellite location, triangulation of available Wi-Fi networks, etc. The processor may also determine recipient rules associated with either the electronic device or the recipient at 630, and may also determine eligible media files that comply with the recipient rules at 640.

At 650 play rules of the mobile device may be determined. This step may be accomplished by a processor in selective communication with a database in which recipient and play rules or profiles are stored. Alternatively, a user may select or establish play rules "on the fly," or right before or during use. Note that the play rules of the mobile device may comprise a selection of a geographic scope from which to provide media files. At 660 eligible media files that comply with play rules of the electronic device may be transmitted to the electronic device and played to the user.

Alternatively, a processor may determine any existing user/recipient profile at 670 and apply the default rules of the profile to potential media files 680 and then play such media files to the recipient 660.

Figure 7:
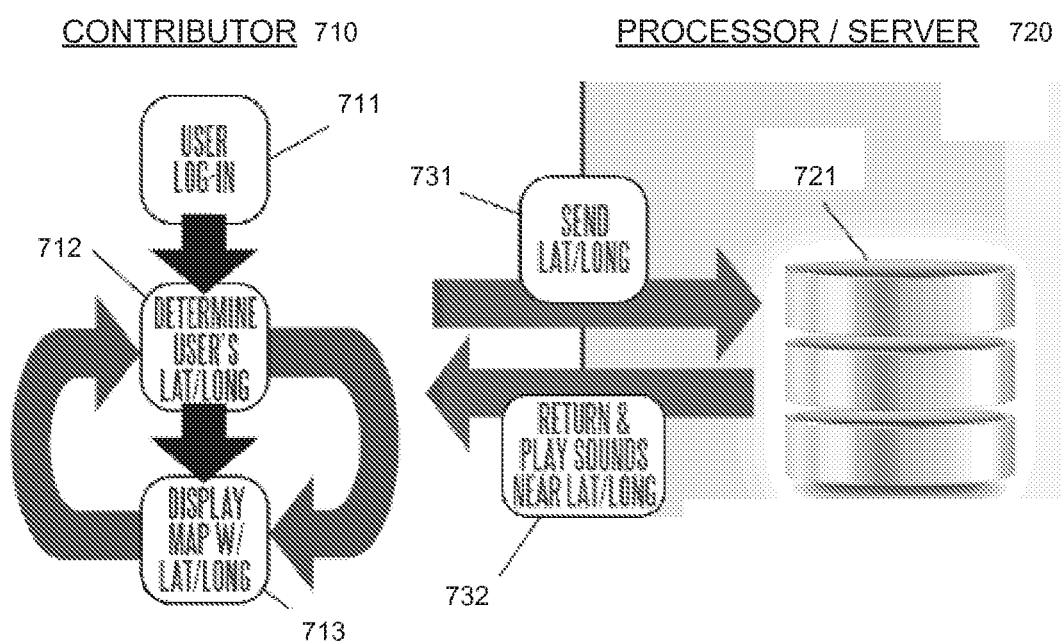
FIG. 7 depicts exemplary interactions between a user and a server when recording media, in accordance with some embodiments of the present invention.

With reference to FIG. 7, a recipient interaction with a server, or a processor, in accordance with some embodiments of the present invention will now be discussed. A recipient 710 may log in to an application, program, or any other interactive device to initiate communication with the server 720. When the recipient logs in, the location (e.g., latitude and longitude) of the electronic device of the user may be determined. A map may be displayed of the location of the user, as well as optionally indicating the locations of any media files associated with the location or nearby locations. Note that the location of the user and the electronic device may be periodically determined and updated, which may trigger updates in the display map and any media files associated with the new location or nearby locations.

When the location is determined (again, for example, by longitude and latitude), the location may be transmitted to the server 720. The server 720 may access a database 721 and identify any media files, for example sounds or audio files, which are associated with a location at or near the location of the user and the electronic device. These sounds or audio files may be presented to the user for selection, or may be automatically played to the user via the electronic device.

Figure 8:
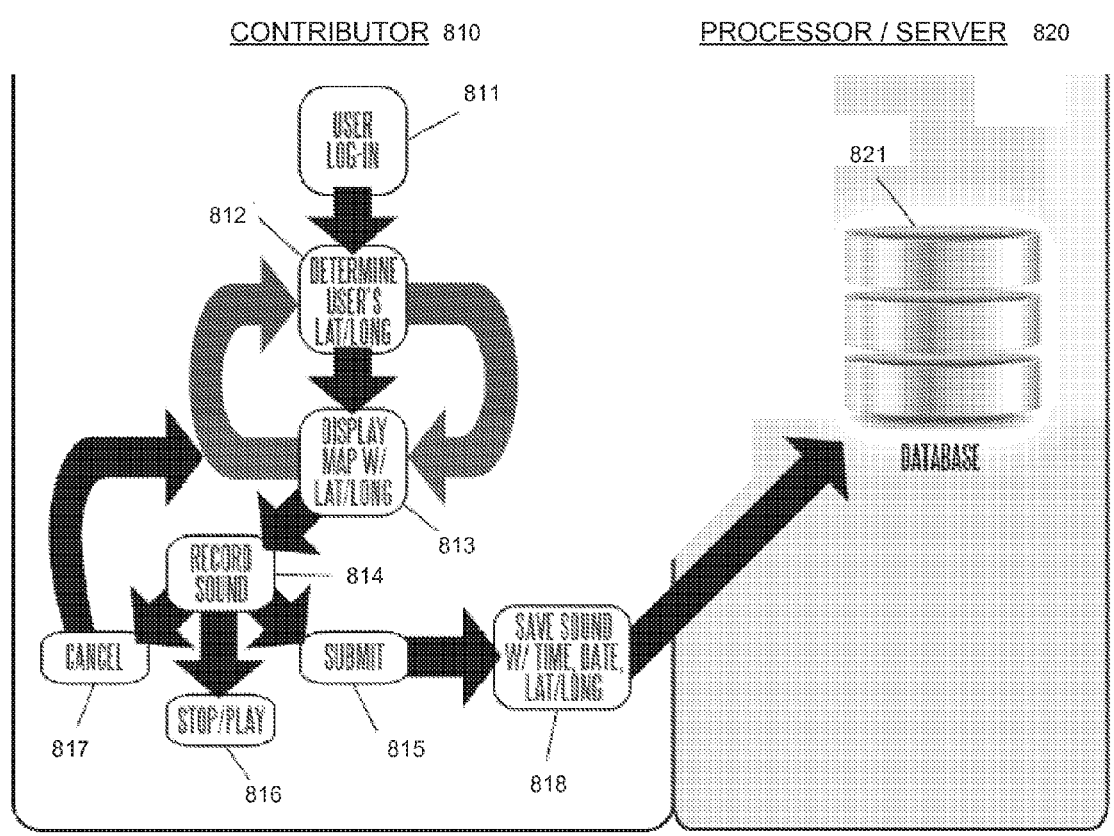
FIG. 8 depicts exemplary interactions between a user and a server when playing the media to the user, in accordance with some embodiments of the present invention.

With reference to FIG. 8, a contributor 810 interaction with a server or processor 820 in accordance with some embodiments of the present invention will now be discussed. A contributor may log in to an application, program, or other interactive device 811. When the contributor logs in, the location (e.g., latitude and longitude) of the electronic device of the user may be determined 812. A map may be displayed of the location of the contributor and electronic device 813. A contributor may then record a media file to be saved 814. For example, a sound may be recorded at 814. Before submitting the sound, the contributor 810 may have the option to cancel the submission 817, stop and/or play the submission back to the contributor 816, or submit the submission 815. If the contributor elects to submit the media file, then the media file (here, for example, sound) may be saved along with time, date, location information (such as longitude and latitude), and any other information that may be relevant to sharing the media file. The media file and associated information may then be sent to a database 821 that may be in selective communication with the server and/or processor 820.

Figure 9:
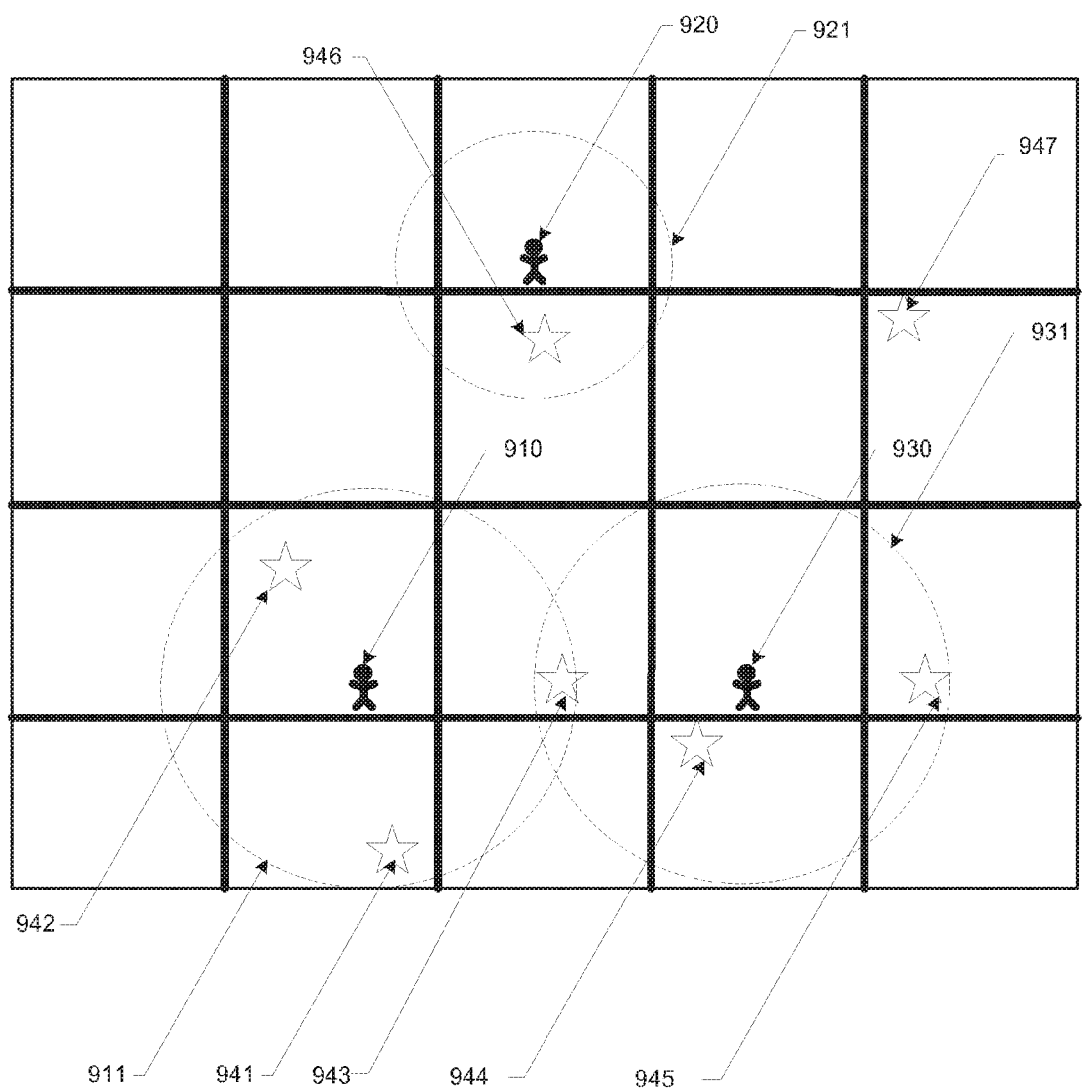
FIG. 9 illustrates an exemplary map of recipients and selected ranges, in accordance with some embodiments of the present invention.

With reference to FIG. 9, an exemplary map 90 of recipients and selected ranges, in accordance with some embodiments of the present invention will now be discussed. The map 90 may set forth various users 910, 920, 930, located at different locations. Each of the users 910, 920, 930 may have elected different geographic ranges 911, 921, 931 respectively, from which to receive media files.

User 910 may, based upon his geographic proximity selection 911, be presented with media files 941, 942, and 943, associated with locations within the range 911. User 920 may only be presented with media file 946 due to his smaller range 921. User 930 may be presented with media files 943 (which is also presented to user 910), 944, and 945. Note that no user will be presented with media file 947, as it is associated with a location outside of the user's selected geographic proximities.

Figure 10:
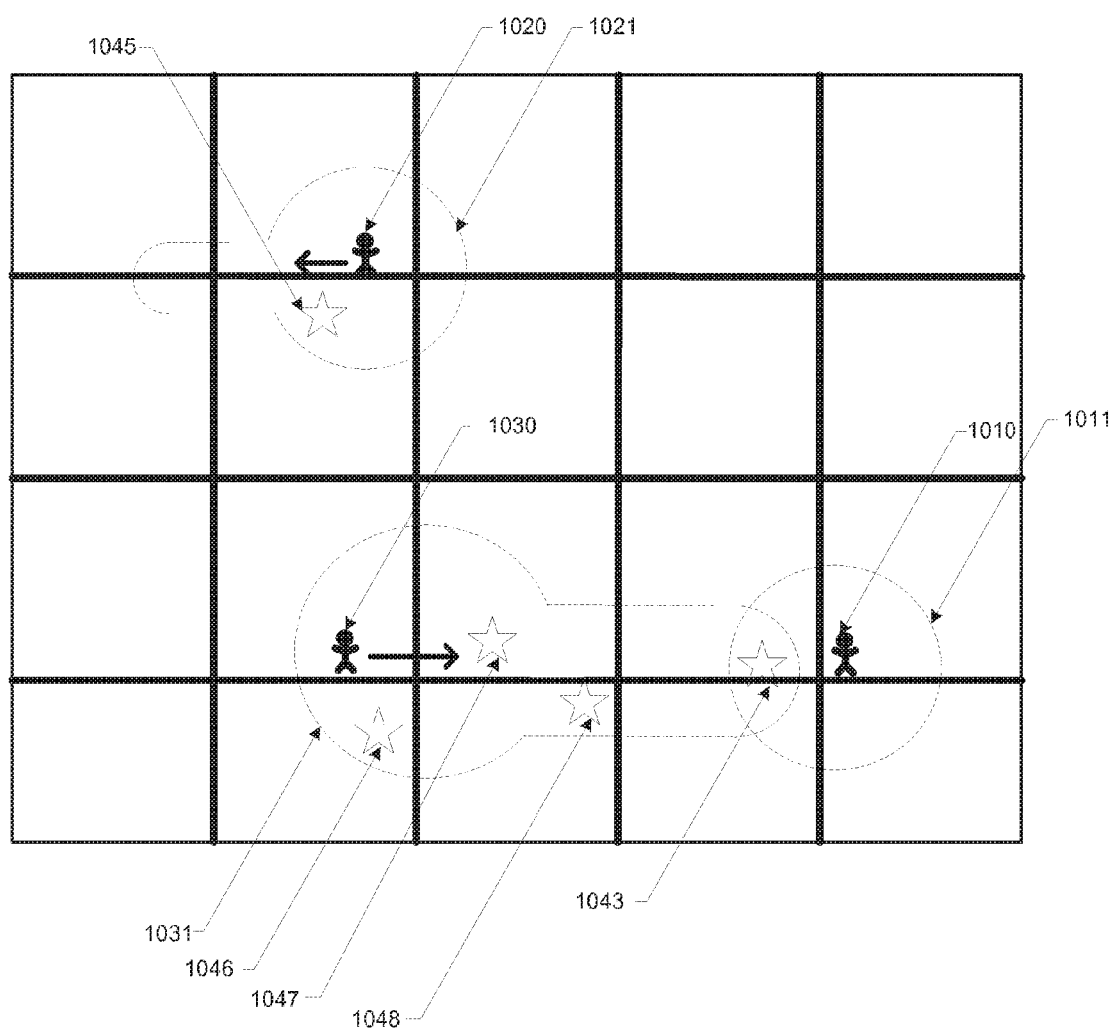
FIG. 10 illustrates an exemplary map of recipients and ranges, in accordance with some embodiments of the present invention.

With reference to FIG. 10, an exemplary map of recipients and selected ranges, in accordance with some embodiments of the present invention will now be discussed. Users 1010, 1020, and 1030 may be seen on map 1000. User 1010 may have a geographic proximity 1011 selected, which may play media files located in the geographic proximity 1011, such as media files 1041, 1042, and 1043. Note that geographic proximity of user 1010 is substantially circular in size, indicating that the user 1010 may be considered by the system to be substantially stationary.

In contrast, user 1020 may be determined by the system to be moving (in a direction indicated by an arrow) at a certain rate of speed. Based upon the determined rate of speed, the system may expand or enlarge the selected geographic proximity 1021 of user 1020 so that media files that will shortly be in the geographic proximity are also presented to user 1020. With reference to FIG. 10, although media file 1045 may be at the instant time beyond the selected geographic proximity of the user 1020, it may be presented to user 1020 based upon the user's anticipated movement.

Similarly, user 1030 may be determined by the system to be traveling at a faster rate of speed than user 1020, and accordingly the geographic proximity 1031 from which to present media files may be extended. Based upon selected geographic range and the user 1030's rate of movement, media files 1046, 1047, 1048, and 1043 may be presented to user 1030. Note that it is contemplated that if user 1030 were to change directions, the geographic proximity would update automatically to provide media files anticipated to be on the trajectory of travel of user 1030.

In other words, In use, a first user may activate a client application to execute on his or her device and log in to the server. The client application determines the user's location by latitude and longitude, such as by using an internal GPS circuit, and may display a map with the location identified. The location determination and map display may be continuously updated. When the user has reached a location at which he or she wishes to record a comment, the user may activate the recording mode of the client application and record his or her remarks. For example, a user visiting an historical site may record his or her comments about the site. A user who is stuck in traffic may record a note to that effect. A user who has eaten at a restaurant may record his or her comments about the meal.

When the first user has finished recording, he or she may stop the recording and play back the comments. If the user is not satisfied with the comments, he or she may cancel them and either re-record them or decide not to make any recording. If the user is satisfied with the comments, he or she may submit them in which case the recording is saved along with the current date, time, and location retrieved from the device. The user's name or other identification may also be saved with the recording or the recording may be saved without such information if the user prefers anonymity. A connection is established with the server and the information transmitted to the server where they are stored in the database.

At any later time, a second user may be logged onto the server through the client application on a mobile device. The client application may constantly or periodically transmit the device's location to the server. If the second user enters the area in which the first user had recorded comments, the server may automatically "serve" or transmit the first user's recorded comments to the second user's device where it is played. The location at which the recording was made may also be indicated on a map displayed on the second user's device. Alternatively, the map display may be replaced by text and/or an media description of the location. The second user also has the opportunity to record his or her own comments and transmit them to the server where they are added to the database and played back to subsequent users along with the recording of the first user.

Accordingly the client application may present a user with a number of set-up options. For example, a user may instruct the application to only play back recordings that were made within a designated radius of the user's current location. If too many or too few recordings are played back in a particular area, the distance may be reduced or enlarged. A user may instruct the client application to only play back recordings that are related to a designated category, such as traffic or restaurants. Combining the latter two options, a user may select different listening radii for different categories, such as a larger radius for traffic information and a smaller radius for historical markers. A user may instruct the client application to only play back recordings that were made by a specific person or by a designated group of people. In addition, a user may also program the client application to retrieve recordings made by a particular person or group of people, such as family members, even if the user is in a different location and would not otherwise receive the recordings. For example, a user in Atlanta may monitor the recordings of a network member who is in New York City.

In accordance with some embodiments of the present invention, a user may press a button on the device to skip a recording or create a list of other users whose recordings are not to be played, thus reducing the likelihood of receiving annoying, offensive, or irrelevant recordings. In accordance with some embodiments of the present invention, a user may enter a particular location, time, and date and listen to any recordings made at that time at that location. In accordance with some embodiments of the present invention, a user planning a trip may use the displayed map to select a route and request that the client application play recordings that have been made along the route, even before starting the trip. A business may record promotions and other information for users to listen to when they are close to the business. For example, a restaurant may record information about a lunch special to attract customers. If desired, a user's recordings may also be posted to other social networks, such as Facebook and Twitter.

It will be understood that the specific embodiments of the present invention shown and described herein are exemplary only. Numerous variations, changes, substitutions and equivalents will now occur to those skilled in the art without departing from the spirit and scope of the invention. Accordingly, it is intended that all subject matter described herein and shown in the accompanying drawings be regarded as illustrative only, and not in a limiting sense, and that the scope of the invention will be solely determined by the appended claims.

What is claimed is:

1. A client application executable on a mobile computing device to provide media and location based social network services, the client application operable to:
   receive, from a user, one or more indications of a type of media file content the user desires to receive;
   determine a current speed of the mobile computing device;
   receive a geographic radius selected by the user, wherein the geographic radius extends from a location of the mobile computing device and a geographic range around the mobile computing device within which the user is to receive media files is defined by the geographic radius and the current speed;
   determine a current location of the mobile computing device;
   transmit, to a server database, the geographic radius, the current speed, and the one or more indications of a type of media file content the user desires to receive;
   receive, from the server database, at least one media file comprising a type of media file content indicated as one the user desires to receive and associated with a location within the geographic range; and
   play, on the mobile computing device, the at least one media file.

2. The client application of claim 1, wherein the location of the mobile computing device is determined based upon a longitude and latitude of the mobile computing device.

3. The client application of claim 1, wherein the at least one media file associated with the location within the geographic range comprises at least one of audio files, video files, or image files.

4. The client application of claim 1, wherein the client application is further configured to:

receive, from the user, an indication of a grouping of submitters from whom the user desires to receive media.

5. The client application of claim 1, wherein the location of the mobile computing device is periodically determined.

6. The client application of claim 1, wherein the mobile computing device is a selected from the group consisting of: a mobile telephone, a tablet computer, a laptop computer, a navigation system, a digital music player, and an electronic reader.

7. The client application of claim 1, wherein the type of media file content is based on one or more topics or tags associated with the media file.

8. A method of recording and providing media files based on a location associated with the media files, the method transacted amongst a processor and one or more electronic devices, the method comprising:
   receiving, at the processor and from a first electronic device:
      a media file;
      data comprising the type of media file content; and
      data comprising information sufficient to identify a location associated with the media file;
   storing, in a database, the media file, the data comprising the type of media file content, and the data comprising information sufficient to identify a location associated with the media file;
   receiving, at the processor and from a second electronic device, information sufficient to identify a location of the second electronic device and a rate of speed of the second electronic device;
   determining, by the processor, a geographic range of the second electronic device based on the location of the second electronic device, the rate of speed of the second electronic device, and a geographic radius, wherein the geographic radius is based upon user selection; and
   responsive to determining that one or more media files stored in the database are associated with a location in the geographic range of the second electronic device and that the one or more media files comprise a type of media file content indicated by a user selection, sending, to the second electronic device, the one or more media files stored in the database that comprise a type of media file content indicated by the user selection and that are associated with a location in the geographic range of the second electronic device.

9. The method of claim 8, wherein the first electronic device is a selected from the group consisting of: a mobile telephone, a tablet computer, a laptop computer, a navigation system, a digital music player, and an electronic reader.

10. The method of claim 8, wherein the one or more media files are at least one of an audio file, video file, or image file.

11. The method of claim 8, wherein the data comprising information sufficient to identify a location associated with the one or more media files comprises a longitude and latitude of the location.

12. The method of claim 8, wherein sending the one or more media files stored in the database comprises:
   ordering, by the processor, the one or more media files according to criteria; and
   sending, to the second electronic device, the one or more media files sequentially.

13. The method of claim 12, wherein the criteria comprise geographic proximity to the second electronic device.

14. The method of claim 13, wherein the processor sends the one or more media files sequentially until a request is received from the second electronic device to stop sending the one or more media files.

15. The method of claim 8, wherein determining a geographic range of the second electronic device based upon a geographic radius comprises:
   determining a first geographic location of the second electronic device at a first time;
   determining a second geographic location of the second electronic device at a second time;
   determining a direction and the rate of speed of the second electronic device; and
   modifying the geographic range of the second electronic device based upon the direction and the rate of speed of the second electronic device.

16. The method of claim 8, wherein the processor receives information sufficient to identify a location of the second electronic device periodically.

17. The method of claim 8 further comprising:
   receiving at the processor, from the first electronic device, data comprising availability rules for the media file, the availability rules comprising one or more of:
   one or more groupings of recipients that may receive the media file; or
   circumstances under which one or more recipients may receive the media file.

18. The method of claim 17, wherein the one or more groupings of recipients that may receive the media file are based on the type of content of the media file.

19. The method of claim 8, wherein the data comprising information sufficient to identify a location associated with the media file is received from a contributor providing the media file.

20. The method of claim 8, wherein the type of media file content comprises one or more of:
   a format of the media file;
   a topic associated with the media file;
   a tag associated with the media file; or
   a category associated with the media file.

* * * * *